United States Patent
Jang et al.

(10) Patent No.: US 12,288,972 B2
(45) Date of Patent: Apr. 29, 2025

(54) PROTECTOR HAVING CLAMP ENGAGING MECHANISM

(71) Applicant: Yazaki Corporation, Tokyo (JP)

(72) Inventors: Youngho Jang, Aichi (JP); Jin Watanabe, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 194 days.

(21) Appl. No.: 18/196,084

(22) Filed: May 11, 2023

(65) Prior Publication Data
US 2023/0369841 A1 Nov. 16, 2023

(30) Foreign Application Priority Data

May 16, 2022 (JP) ................................. 2022-080024

(51) Int. Cl.
*H02G 3/32* (2006.01)

(52) U.S. Cl.
CPC .................................... *H02G 3/32* (2013.01)

(58) Field of Classification Search
CPC .... B60R 16/0215; H02G 3/32; H02G 3/0406; H02G 3/045

USPC ......................................................... 174/480
See application file for complete search history.

(56) References Cited

U.S. PATENT DOCUMENTS

| 8,322,782 B2* | 12/2012 | Shallcross ........... B60R 16/0215 296/210 |
| 9,979,170 B1* | 5/2018 | Nakano ................ H01B 7/0045 |
| 2009/0115226 A1* | 5/2009 | Shallcross ........... B60R 16/0215 296/210 |
| 2021/0328418 A1* | 10/2021 | Naganishi .............. H02G 3/263 |

FOREIGN PATENT DOCUMENTS

JP 2000-249120 A 9/2000

* cited by examiner

*Primary Examiner* — Timothy J Thompson
*Assistant Examiner* — Michael F McAllister
(74) *Attorney, Agent, or Firm* — Sughrue Mion, PLLC

(57) ABSTRACT

A protector includes: a protector body having a routing part in which a wire harness is routed, and a clamp attachment part in which a locking hole is formed; and a clamp which is locked in the locking hole to hold the wire harness. The clamp includes a pair of clamp-side flat parts which are formed to face in directions opposite to each other. The clamp attachment part has a pair of rotation prevention portions which are provided with the locking hole therebetween and which include body-side flat parts facing the clamp-side flat parts.

3 Claims, 4 Drawing Sheets

PROTECTOR HAVING CLAMP ENGAGING MECHANISM

CROSS-REFERENCE TO RELATED APPLICATION

The present application is based on, and claims priority from the prior Japanese Patent Application No. 2022-080024, filed on May 16, 2022, the entire contents of which are incorporated herein by reference.

TECHNICAL FIELD

The present disclosure relates to a protector.

BACKGROUND

Inside a vehicle such as a motor vehicle, a number of wire harnesses that bundle a plurality of wires are arranged, and in some cases a protector is mounted on such wire harnesses to protect the wires. The protector is provided with a protector body having a routing part where the wire harness is routed and a clamp attachment part in which a locking hole is formed, and a clamp that is locked in the locking hole to hold the wire harness (see JP 2000-249120 A, for example).

SUMMARY

In the clamp disclosed in JP 2000-249120 A, since there is a gap between the locking hole and the locking protrusion at the clamp side due to dimensional tolerances or the like, the clamp rotates around the locking hole, and the clamp may disengage from the clamp attachment part due to a decrease in the overlap allowance.

An object of the present disclosure is to provide a protector that is advantageous in preventing a clamp from disengaging from a clamp attachment part.

A protector according to an embodiment includes: a protector body having a routing part in which a wire harness is routed, and a clamp attachment part in which a locking hole is formed; and a clamp which is locked in the locking hole to hold the wire harness. The clamp includes a pair of clamp-side flat parts which are formed to face in directions opposite to each other. The clamp attachment part has a pair of rotation prevention portions which are provided with the locking hole therebetween and which include body-side flat parts facing the clamp-side flat parts.

The above configuration makes it possible to provide a protector that is advantageous in preventing a clamp from disengaging from a clamp attachment part.

DETAILED DESCRIPTION

Various embodiments will be described hereinafter with reference to the accompanying drawings.

Figure 1:
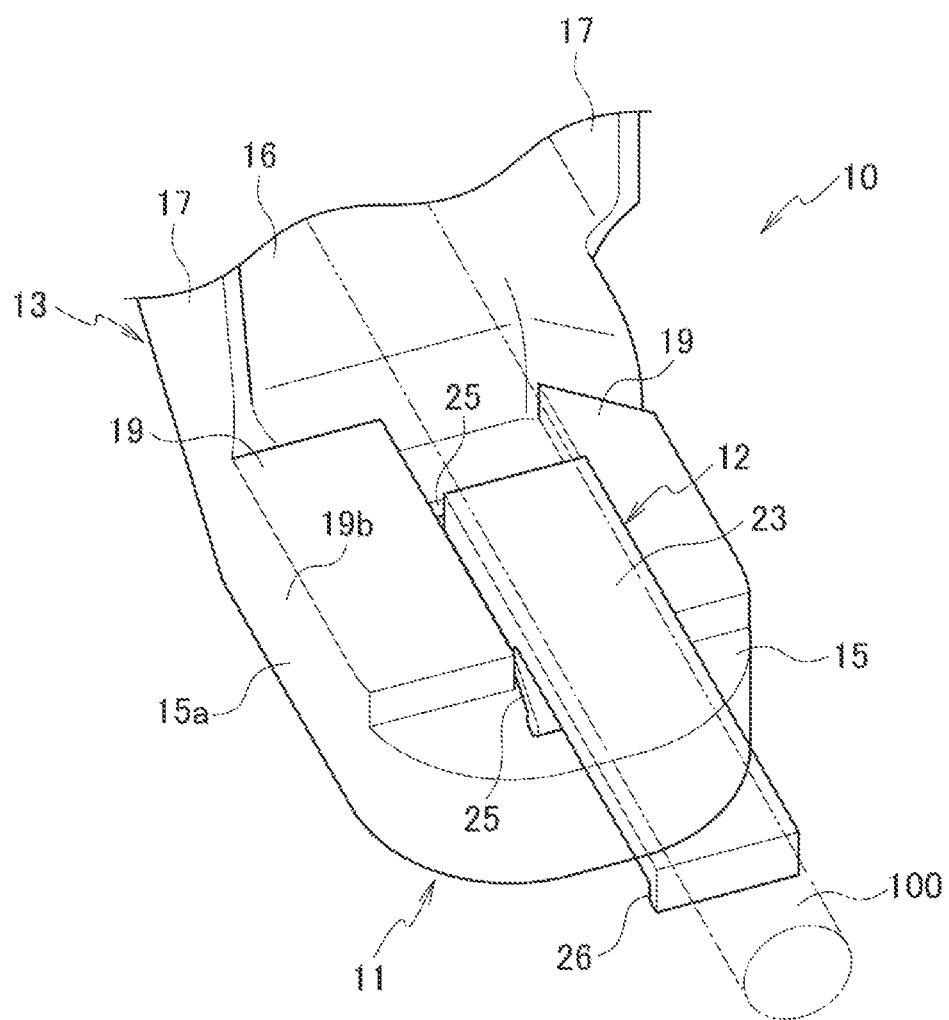
FIG. 1 is a perspective view of a main portion of a protector according to an embodiment as an example.
Figure 2:
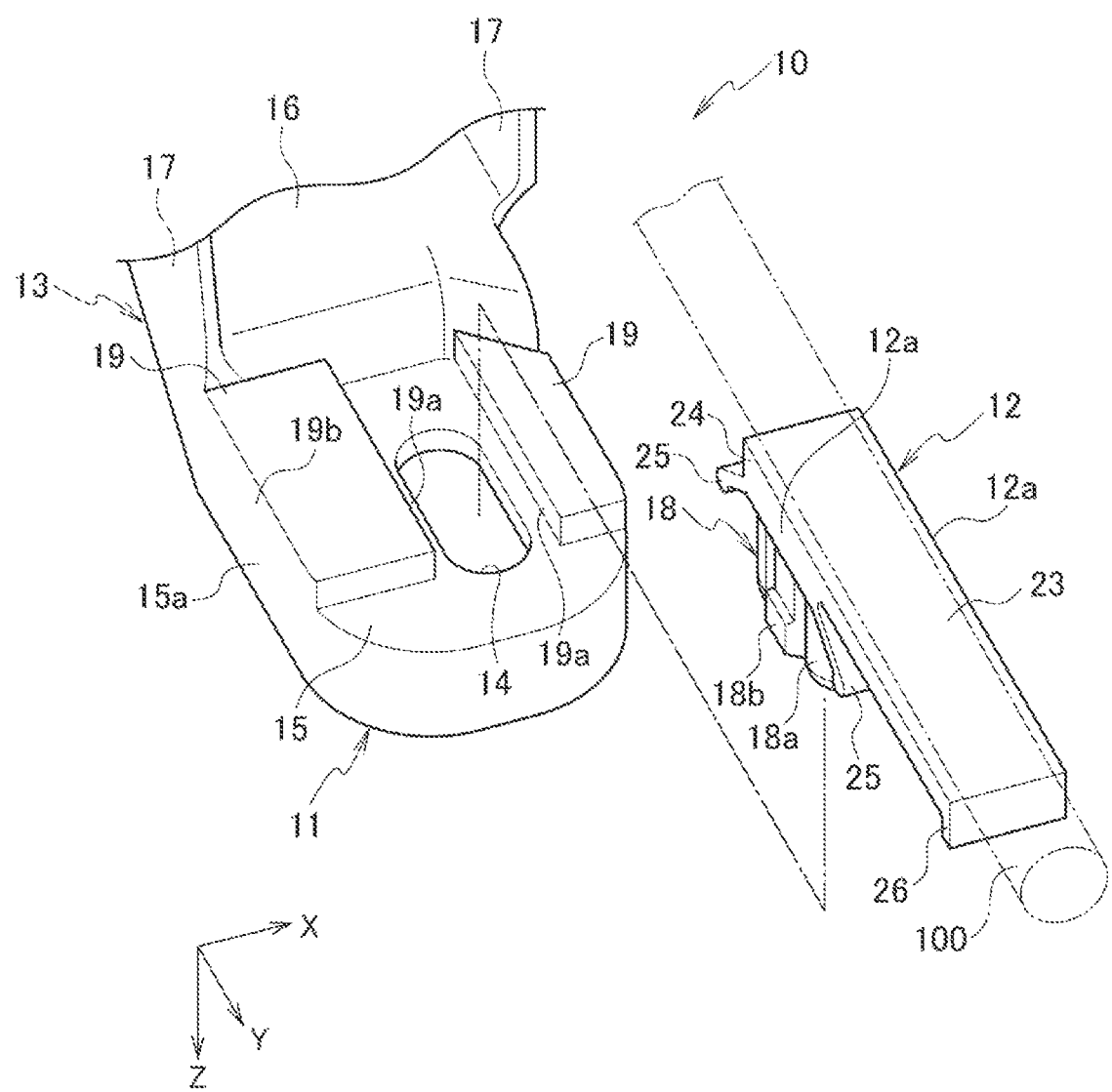
FIG. 2 is an exploded view of the main portion of the protector according to the embodiment.

FIG. 1 is a perspective view of a main portion of a protector 10 according to an embodiment, and FIG. 2 is an exploded view of the main portion of the protector 10 according to the embodiment. The protector 10 illustrated in FIG. 2 is in a state before a clamp 12 described later is attached to a clamp attachment part 15 of a protector body 11.

The protector 10 holds a wire harness 100 that is installed in a vehicle such as a motor vehicle and routed inside the vehicle. The wire harness 100 is formed of a bundle of wires. The shape or structure of the wire harness 100 to be held by the protector 10 is not particularly limited. In the following figures, the wire harness 100 is illustrated schematically as a two-dot chain line.

The protector 10 has a protector body 11 fixed to a panel such as a body panel (not illustrated) inside the vehicle, and a clamp 12 that is configured to hold the wire harness 100. The material of the protector body 11 and the clamp 12 is, for example, a synthetic resin material.

The protector 10 is supported by a panel (not illustrated). For this reason, in the following figures, the up-down direction in which the protector 10 is installed on the panel is defined as the Z direction. In addition, two directions perpendicular to each other in virtual planes perpendicular to the Z direction are defined as the X direction and the Y direction. Of these directions, the Y direction is along the extension direction when the wire harness 100 is attached.

Figure 3:
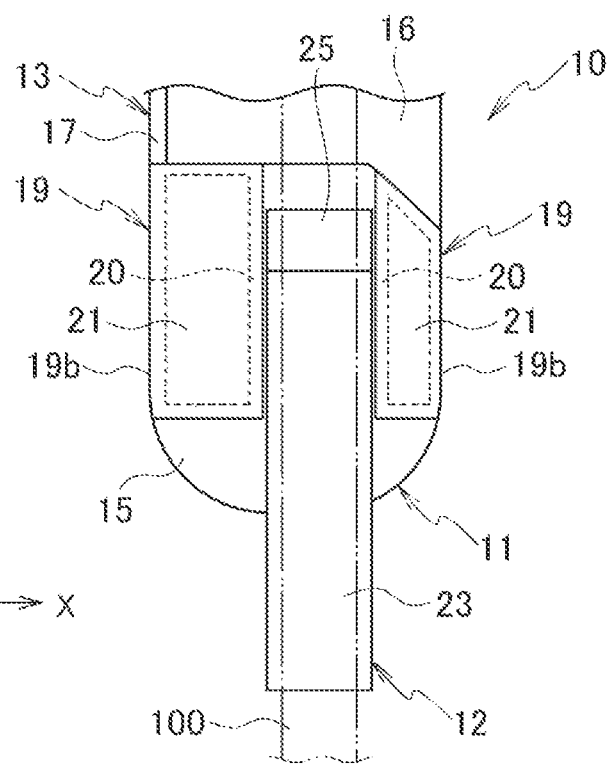
FIG. 3 is a plan view of the main portion of the protector according to the embodiment.
Figure 4:
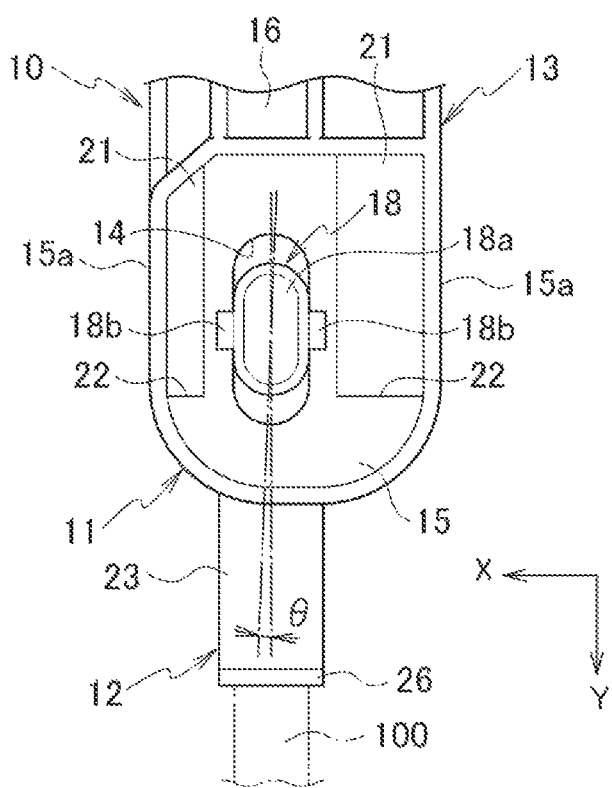
FIG. 4 is a bottom view of the main portion of the protector according to the embodiment.
Figure 5:
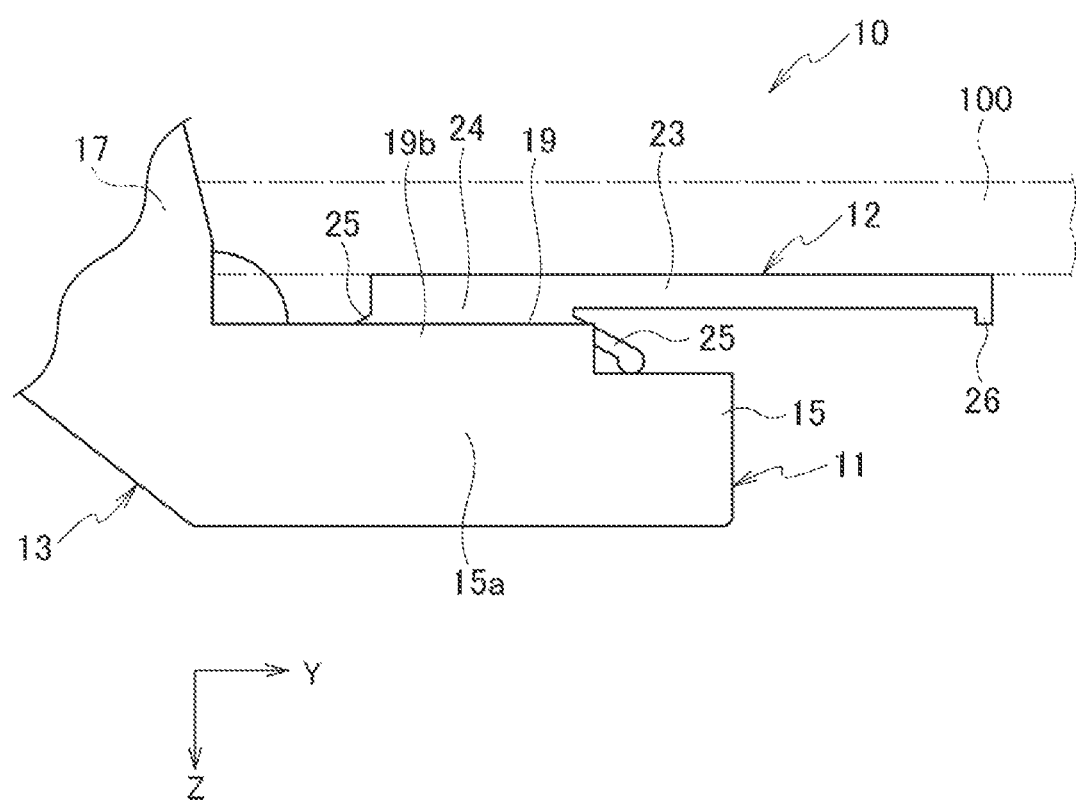
FIG. 5 is a side view of the main portion of the protector according to the embodiment.

FIG. 3 is a plan view of the main portion of the protector 10 according to the embodiment, and FIG. 4 is a bottom view of the main portion of the protector 10 according to the embodiment. In addition, FIG. 5 is a side view of the main portion of the protector 10 according to the embodiment.

The protector body 11 includes: a routing part 13 in which the wire harness 100 is routed; and the clamp attachment part 15 in which a locking hole 14 is formed.

The wire harness 100 is routed in the routing part 13. The routing part 13 is formed in a U-shape in cross section, and has a bottom wall 16 and a pair of side walls 17 and 17. A cover (not illustrated) may be mounted to cover the opening side of the routing part 13.

The clamp attachment part 15 is formed with a locking hole 14 into which a locking protrusion 18 of the clamp 12 described later is inserted. The locking hole 14 is formed as a long hole which is long in the Y direction. The clamp attachment part 15 has a pair of rotation prevention portions 19 and 19 which are provided with the locking hole 14 therebetween and which include body-side flat parts 19a facing clamp-side flat parts 12a described later.

The pair of rotation prevention portions 19 and 19 are provided to extend in a direction away from the locking hole 14 (X direction). End surfaces 19b of the rotation prevention portions 19 positioned opposite to the locking hole 14 are flush with side surfaces 15a of the clamp attachment part 15 positioned opposite to the locking hole 14.

The spacing between the pair of rotation prevention portions 19 and 19 is slightly larger than the width of a harness attachment part 23 of the clamp 12 described later, or is almost the same as the width of the harness attachment part 23.

By sandwiching the clamp 12 between the pair of rotation prevention portions 19 and 19, it is possible to prevent the clamp 12 from rotating around the locking hole 14.

Specifically, the rotation prevention portions 19 are configured of quadrangular frame-like ribs 20, and upper walls 21 connected to the ends of the ribs 20 in the Z direction (upper ends) (see FIG. 3). In addition, recesses 22 are provided on the opposite side of the clamp attachment part 15 at positions corresponding to the ribs 20 and the upper walls 21 (see FIG. 4).

In the present embodiment, the end faces of the ribs 20 at the locking hole 14 side correspond to the body-side flat parts 19a, and the end faces of the ribs 20 at the side opposite to the locking hole 14 side correspond to the end surfaces 19b which are flush with the side surfaces 15a of the clamp attachment part 15 positioned at the side opposite to the locking hole 14. That is, in a state in which the clamp 12 is attached to the clamp attachment part 15, the end faces of the ribs 20 at the locking hole 14 side (the body-side flat parts 19a) face the clamp-side flat parts 12a in the clamp 12.

The clamp 12 is locked in the locking hole 14 to hold the wire harness 100. The clamp 12 includes the pair of clamp-side flat parts 12a and 12a which are formed to face in directions opposite to each other.

The clamp 12 includes: a harness attachment part 23 to which the wire harness 100 is attached; a locking protrusion 18 which is inserted into the locking hole 14; and a connection part 24 which is formed between the harness attachment part 23 and the locking protrusion 18. In addition, the clamp 12 includes a pair of elastic pieces 25 and 25 which are provided, respectively, at both ends of the connection part 24 in the Y direction and which abut on the clamp attachment part 15.

The harness attachment part 23 is a flat plate extending in the Y direction. The locking protrusion 18, the connection part 24 and the pair of elastic pieces 25 and 25 are provided on one end of the harness attachment part 23 in the Y direction, and a protrusion 26 protruding in the Z direction from the harness attachment part 23 is provided on the other end of the harness attachment part 23 in the Y direction (see FIG. 5). The protrusion 26 functions as a rib to prevent slipping of a fastener.

The locking protrusion 18 is locked in the locking hole 14 of the clamp attachment part 15. The locking protrusion 18 has a locking shaft 18a protruding in the Z direction. When the locking protrusion 18 is locked, the locking shaft 18a is inserted into the locking hole 14 formed in the clamp attachment part 15. In addition, the locking shaft 18a has hook portions 18b on both side surfaces perpendicular to the Y direction. When the locking shaft 18a is inserted into the locking hole 14, the pair of hook portions 18b and 18b pass through the locking hole 14 and are engaged with the periphery of the locking hole 14 after passing therethrough. This allows the clamp attachment part 15 to be sandwiched between the hook portions 18b and the elastic pieces 25. Accordingly, the locking protrusion 18 is locked to the clamp attachment part 15, and thus the clamp 12 is supported by the clamp attachment part 15.

In the present embodiment, a portion of the side surface of the connection part 24 and the elastic piece 25 in the clamp 12 corresponds to the clamp-side flat part 12a. That is, in a state where the clamp 12 is attached to the clamp attachment part 15, a portion of the side surface of the connection part 24 and the elastic piece 25 in the clamp 12 (the clamp-side flat part 12a) faces the body-side flat part 19a in the clamp attachment part 15.

Next, the operation of the protector 10 will be described.

First, the wire harness 100 is attached to the clamp 12 using a fastener (not illustrated) such as a tie band or an adhesive tape.

Then, the clamp 12 to which the wire harness 100 is fixed is connected to the clamp attachment part 15 of the protector 10.

The clamp 12 connected to the clamp attachment part 15 of the protector 10 is sandwiched between the pair of rotation prevention portions 19 and 19, thereby making it possible to reduce the amount of rotation θ of the clamp 12 (see FIG. 4).

Next, the effect of the protector 10 will be described.

The protector 10 according to the present embodiment includes: the protector body 11 having the routing part 13 in which the wire harness 100 is routed and the clamp attachment part 15 in which the locking hole 14 is formed; and the clamp 12 which is locked in the locking hole 14 to hold the wire harness 100. The clamp 12 includes the pair of clamp-side flat parts 12a and 12a which are formed to face in directions opposite to each other. The clamp attachment part 15 has the pair of rotation prevention portions 19 and 19 which are provided with the locking hole 14 therebetween and which include the body-side flat parts 19a facing the clamp-side flat parts 12a.

The protector 10 according to the present embodiment makes it possible to prevent the clamp 12 from rotating around the locking hole 14 by sandwiching the clamp 12 between the pair of rotation prevention portions 19 and 19. That is, the clamp 12 is sandwiched between the pair of rotation prevention portions 19 and 19, and thus it is possible to reduce the amount of rotation θ of the clamp 12 (see FIG. 4). This makes it possible to prevent the clamp 12 from rotating around the locking hole 14, thereby making it possible to prevent the clamp 12 from disengaging from the clamp attachment part 15 due to a decrease in the overlap allowance.

As described above, the present embodiment makes it possible to provide the protector 10 that is advantageous in preventing the clamp 12 from disengaging from the clamp attachment part 15.

In the protector 10 according to a second aspect of the present embodiment, the pair of rotation prevention portions 19 and 19 are provided to extend in a direction away from the locking hole 14. The end surfaces 19b of the rotation prevention portions 19 positioned opposite to the locking hole 14 are flush with the side surfaces 15a of the clamp attachment part 15 positioned opposite to the locking hole 14.

In this way, since the rotation prevention portions 19 are formed with a wide width, it is possible prevent burrs from occurring in the rotation prevention portions 19 when the protector 10 is manufactured.

In the protector 10 according to a third aspect of the present embodiment, the clamp 12 includes: the harness attachment part 23 to which the wire harness 100 is attached; and the locking protrusion 18 which is inserted into the locking hole 14. The clamp 12 includes: the connection part 24 which is formed between the harness attachment part 23 and the locking protrusion 18; and a pair of elastic pieces 25 and 25 which are provided, respectively, at both ends of the connection part 24 in the direction in which the wire harness 100 is routed and which abut on the clamp attachment part 15.

Since the clamp 12 is configured with the locking protrusion 18 and the pair of elastic pieces 25 and 25, it is possible for the clamp attachment part 15 to be sandwiched between the locking protrusion 18 and the elastic piece 25, thereby making it possible for the pair of elastic pieces 25 and 25 to contribute to preventing the clamp 12 from rotating.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A protector comprising:
    a protector body having a routing part in which a wire harness is routed, and a clamp attachment part in which a locking hole is formed; and
    a clamp which is locked in the locking hole to hold the wire harness, wherein
    the clamp includes a pair of clamp-side flat parts which are formed to face in directions opposite to each other, and
    the clamp attachment part has a pair of rotation prevention portions which are provided with the locking hole therebetween and which include body-side flat parts facing the clamp-side flat parts.

2. The protector according to claim 1, wherein
    the pair of rotation prevention portions are provided to extend in a direction away from the locking hole, and
    end surfaces of the rotation prevention portions positioned opposite to the locking hole are flush with side surfaces of the clamp attachment part positioned opposite to the locking hole.

3. The protector according to claim 1, wherein
    the clamp includes:
    a harness attachment part to which the wire harness is attached;
    a locking protrusion which is inserted into the locking hole;
    a connection part which is formed between the harness attachment part and the locking protrusion; and
    a pair of elastic pieces which are provided, respectively, at both ends of the connection part in a direction in which the wire harness is routed and which abut on the clamp attachment part.

* * * * *